(12) United States Patent
Yoon et al.

(10) Patent No.: US 11,656,777 B2
(45) Date of Patent: May 23, 2023

(54) MEMORY SYSTEM AND OPERATING METHOD THEREOF

(71) Applicant: SK hynix Inc., Gyeonggi-do (KR)

(72) Inventors: Young Mi Yoon, Gyeonggi-do (KR); Hyoung Suk Jang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 38 days.

(21) Appl. No.: 17/307,293

(22) Filed: May 4, 2021

(65) Prior Publication Data
US 2022/0171533 A1 Jun. 2, 2022

(30) Foreign Application Priority Data
Nov. 30, 2020 (KR) .................. 10-2020-0164031

(51) Int. Cl.
*G06F 3/06* (2006.01)
(52) U.S. Cl.
CPC ............ *G06F 3/064* (2013.01); *G06F 3/0619* (2013.01); *G06F 3/0652* (2013.01); *G06F 3/0659* (2013.01); *G06F 3/0679* (2013.01)
(58) Field of Classification Search
CPC ...... G06F 3/064; G06F 3/0619; G06F 3/0652; G06F 3/0659; G06F 3/0679
USPC ........................................................ 711/154
See application file for complete search history.

(56) References Cited

U.S. PATENT DOCUMENTS

| | | | |
|---|---|---|---|
| 2020/0348887 A1* | 11/2020 | Kim | G06F 3/0619 |
| 2021/0255799 A1* | 8/2021 | Kale | G06N 3/088 |
| 2022/0057952 A1* | 2/2022 | Bueb | G01K 3/005 |
| 2022/0075438 A1* | 3/2022 | Palmer | G06F 1/3296 |

FOREIGN PATENT DOCUMENTS

| | | |
|---|---|---|
| KR | 10-2017-0015708 A | 2/2017 |
| KR | 10-2020-0045544 A | 5/2020 |

* cited by examiner

*Primary Examiner* — Gautam Sain
(74) *Attorney, Agent, or Firm* — IP & T Group LLP

(57) ABSTRACT

Embodiments of the present disclosure relate to a memory system and an operating method thereof. According to the embodiments of the present disclosure, the memory system may repeatedly execute, when entering a low power mode, iterations of a target operation according to a temperature of the memory system until a stop condition is satisfied. In this case, the target operation may be a garbage collection operation for the plurality of memory blocks or a migration operation of moving data stored in a first area including at least one of the plurality of memory blocks to a second area including at least one of the plurality of memory blocks. The operation speed of the memory block included in the first area may be higher than the operation speed of the memory block included in the second area.

17 Claims, 16 Drawing Sheets

FIG.5
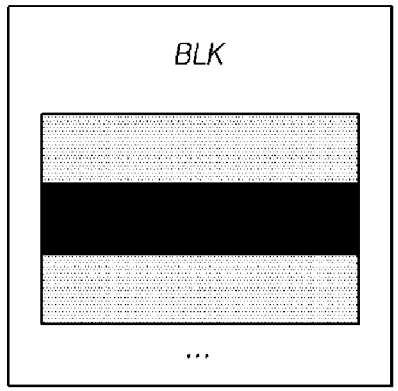
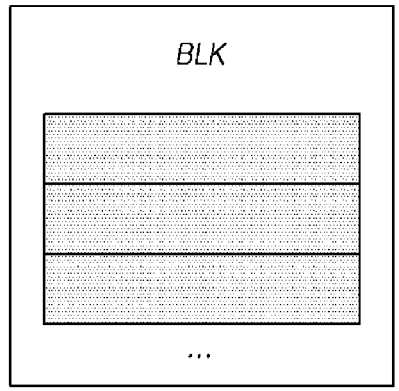
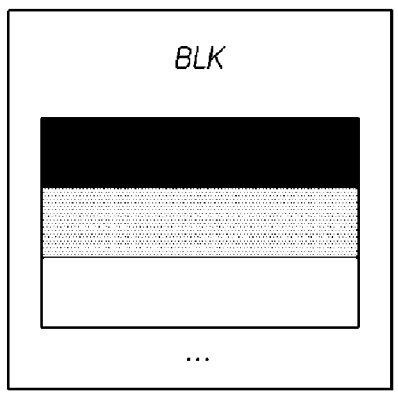
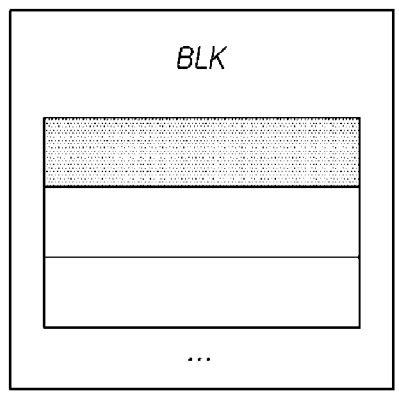
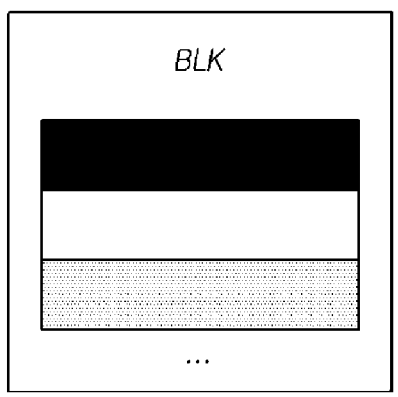
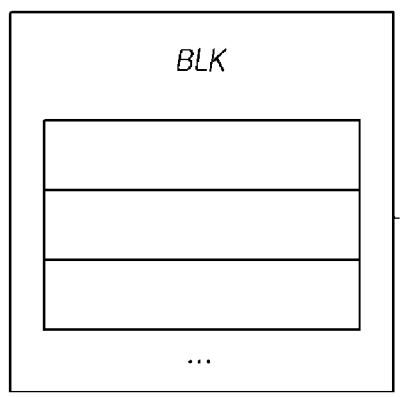

FIG.9

| Level | L1 | L2 | L3 | L4 | L5 |
|-------|----|----|----|----|----|
| delay | DELAY_1 | DELAY_2 | DELAY_3 | DELAY_4 | DELAY_5 |

L1 : (temperature) <= T1
L2 : T1 < (temperature) <= T2
L3 : T2 < (temperature) <= T3
L4 : T3 < (temperature) <= T4
L5 : T4 < (temperature)

FIG.10

| Level | L1' | L2' | L3' | L4' | L5' |
|---|---|---|---|---|---|
| Period(sec) | 1 | 2 | 3 | 4 | 5 |

L1' : (temperature) <= T1'
L2' : T1' < (temperature) <= T2'
L3' : T2' < (temperature) <= T3'
L4' : T3' < (temperature) <= T4'
L5' : T4' < (temperature)

MEMORY SYSTEM AND OPERATING METHOD THEREOF

CROSS-REFERENCE TO RELATED APPLICATION

The present application claims priority under 35 U.S.C. 119(a) to Korean patent application number 10-2020-0164031 filed on Nov. 30, 2020, which is incorporated herein by reference in its entirety.

BACKGROUND

1. Technical Field

The embodiments relate to a memory system and an operating method thereof.

2. Related Art

A memory system includes a data storage device that stores data on the basis of a request from a host, such as a computer, servers, a smartphone, a tablet PC, or other electronic devices. The examples of the memory system span from a traditional magnetic-disk-based hard disk drive (HDD) to a semiconductor-based data storage device such as a solid state drive (SSD), a universal flash storage device (UFS), or an embedded MMC (eMMC) device.

The memory system may further include a memory controller for controlling a memory device. The memory controller may receive a command from the host and, on the basis of the received command, may execute the command or control read/write/erase operations on the memory devices in the memory system. The memory controller may be used to execute firmware operations for performing a logical operation for controlling such operations.

Furthermore, the memory system may enter a low power mode when specific conditions are satisfied to reduce power consumption. For example, the memory system may enter the low power mode when the idle state continues for a predetermined time or longer.

SUMMARY

Embodiments of the present disclosure may provide a memory system and an operating method thereof capable of satisfying performance requirements even in an environment where a low power mode is frequently entered.

In addition, embodiments of the present disclosure may provide a storage system and an operating method thereof capable of maximizing performance consistency.

In one aspect, embodiments of the present disclosure may provide a memory system including a memory device including a plurality of memory blocks, and a memory controller for communicating with the memory device and controlling the memory device.

The memory controller may execute, when entering a low power mode, iterations of a target operation according to a temperature of the memory system until a stop condition is satisfied.

The target operation may be a garbage collection operation for the plurality of memory blocks or a migration operation of moving data stored in a first area including at least one of the plurality of memory blocks to a second area including at least one of the plurality of memory blocks. In this case, the operation speed of the memory block included in the first area may be higher than the operation speed of the memory block included in the second area.

The memory controller may monitor the temperature of the memory system at a start of each of the iterations.

The memory controller may execute each iteration when the temperature of the memory system is less than or equal to a first threshold temperature, and delays, when the temperature of the memory system exceeds the first threshold temperature, the iterations by a delay time determined according to the temperature of the memory system.

In another aspect, embodiments of the present disclosure may provide an operating method of the memory system including a memory device with a plurality of memory blocks.

The operating method of the memory system may include monitoring whether the memory system enters a low power mode.

The operating method of the memory system may include executing, when entering the low power mode, iterations of a target operation according to a temperature of the memory system until a stop condition is satisfied.

The target operation may be a garbage collection operation for the plurality of memory blocks or a migration operation of moving data stored in a first area including at least one of the plurality of memory blocks to a second area including at least one of the plurality of memory blocks. The operation speed of the memory block included in the first area is higher than the operation speed of the memory block included in the second area.

The step of executing the iterations of the target operation according to the temperature of the memory system may include monitoring the temperature of the memory system at a start of each of the iterations.

The step of executing the iterations of the target operation according to the temperature of the memory system may include executing each iteration when the temperature of the memory system is less than or equal to a first threshold temperature, and delaying, when the temperature of the memory system exceeds the first threshold temperature, after the iterations by a delay time determined according to the temperature of the memory system.

In another aspect, embodiments of the present disclosure may provide a memory system including a memory device including plural memory blocks and a controller.

The controller may select one of a garbage collection operation and a data migration operation according to a number of free blocks among the memory blocks.

The controller may control the device to perform the selected operation. The controller may perform, in a low power mode of the system, a set of the selecting and the controlling according to a temperature of the system.

The memory blocks may be nonvolatile.

The data migration operation may be an operation of migrating data from a high operation-speed block to a high storage-capacity block among the memory blocks.

The controller may iteratively perform the set with an interval.

The controller may delay the iterations of the set by an amount of time as the temperature becomes greater than a first threshold.

The controller may increase the amount of time as the temperature increases.

The controller may interrupt the iterations when the temperature becomes greater than a second threshold or a consecutive number of times that the iteration is delayed become greater than a third threshold.

The controller may increase the interval as the temperature increases.

According to the embodiments of the present disclosure, it is possible to satisfy the performance requirements even in environments that frequently enter the low power mode.

Furthermore, according to the embodiments of the present disclosure, it is possible to ensure the maximum performance consistency.

BRIEF DESCRIPTION OF THE DRAWINGS

FIG. 5 is a diagram illustrating the garbage collection operation which is an example of a target operation.

FIG. 9 is a diagram illustrating an example of determining the delay time according to temperature.

FIG. 10 is a diagram illustrating an example of determining the period between iterations according to temperature.

DETAILED DESCRIPTION

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Figure 1:
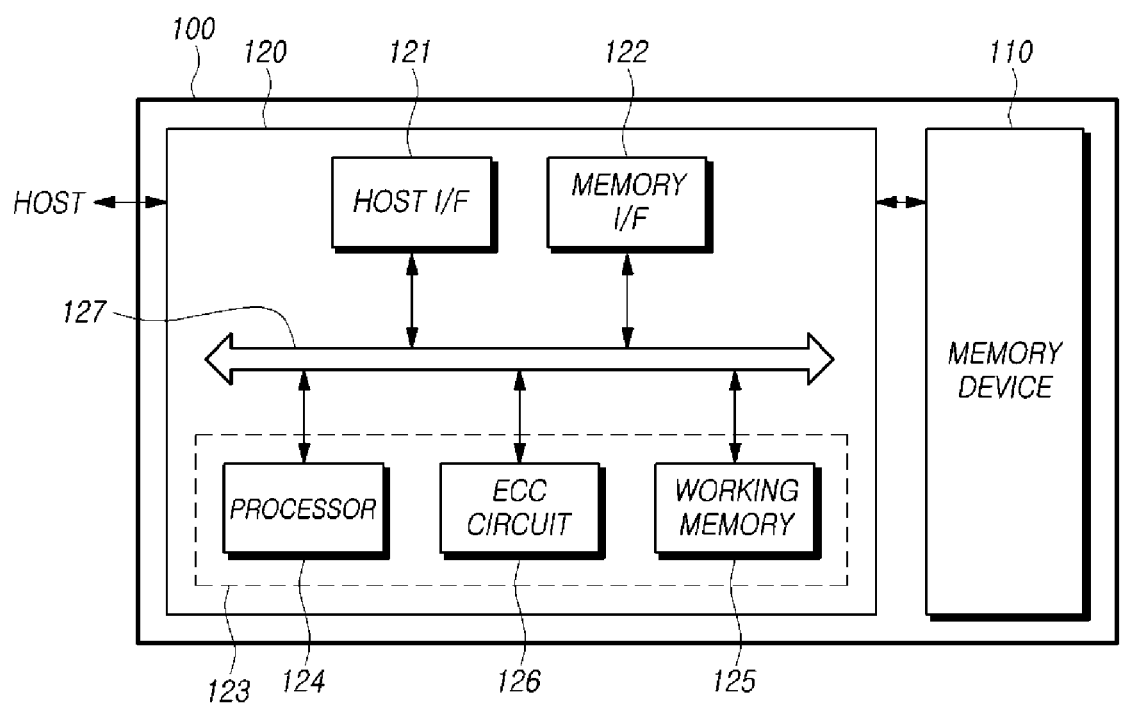
FIG. 1 is a schematic diagram illustrating a configuration of a memory system based on an embodiment of the disclosed technology.

FIG. 1 is a diagram illustrating the schematic configuration of a memory system 100 based on an embodiment of the disclosed technology.

In some implementations, the memory system 100 may include a memory device 110 configured to store data, and a memory controller 120 configured to control the memory device 110.

The memory device 110 may include multiple memory blocks each including a plurality of memory cells for storing data. The memory device 110 may be configured to operate in response to control signals received from the memory controller 120. Operations of the memory device 110 may include, for example, a read operation, a program operation (also referred to as a "write operation"), an erasure operation, and the like.

The memory cells in the memory device 110 are used to store data and may be arranged in a memory cell array. The memory cell array may be divided into memory blocks of memory cells and each block includes different pages of memory cells. In typical implementations of NAND flash memory devices, a page of memory cells is the smallest memory unit that can be programmed or written, and the data stored in memory cells can be erased at the block level.

In some implementations, the memory device 110 may be implemented as various types, such as a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Some embodiments of the disclosed technology are applicable to any type of flash memory devices having an electric charge storage layer. In an implementation, the electric charge storage layer may be formed of a conductive material, and such an electric charge storage layer can be called a floating gate. In another implementation, the electric charge storage layer may be formed of an insulating material, and such a flash memory device can be called a charge trap flash (CTF).

The memory device 110 may be configured to receive a command and an address from the memory controller 120 to access an area of the memory cell array selected using the address. That is, the memory device 110 may perform an operation corresponding to the received command on a memory area of the memory device having a physical address corresponding to the received address from the memory controller 120.

In some implementations, the memory device 110 may perform a program operation, a read operation, an erasure operation, and the like. During the program operation, the memory device 110 may write data in the area selected by the address. During the read operation, the memory device 110 may read data from a memory area selected by the address. During the erasure operation, the memory device 110 may erase data stored in a memory area selected by the address.

The memory controller 120 may control write (program), read, erasure, and background operations that are performed on the memory device 110. The background operations may include, for example, operations that are implemented to optimize the overall performance of the memory device 110, such as a garbage collection operation (GC), a wear leveling (WL) operation, and a bad block management (BBM) operation.

The memory controller 120 may control the operation of the memory device 110 at the request of a host. Alternatively, the memory controller 120 may control the operation of the memory device 110 even in absence of request from the host when it performs background operations of the memory device.

The memory controller 120 and the host may be separate devices. In some implementations, the memory controller 120 and the host may be integrated and implemented as a single device. In the following description, the memory controller 120 and the host will be discussed as separate devices as an example.

Referring to FIG. 1, the memory controller 120 may include a memory interface 122, a control circuit 123, and a host interface 121.

The host interface 121 may be configured to provide an interface for communication with the host.

When receiving a command from the host HOST, the control circuit 123 may receive the command through the host interface 121 and may perform an operation of processing the received command.

The memory interface 122 may be directly or indirectly connected to the memory device 110 to provide an interface for communication with the memory device 110. That is, the memory interface 122 may be configured to provide the memory device 110 and the memory controller 120 with an interface for the memory controller 120 to perform memory operations on the memory device 110 based on control signals and instructions from the control circuit 123.

The control circuit 123 may be configured to control the operation of the memory device 110 through the memory controller 120. For example, the control circuit 123 may include a processor 124 and a working memory 125. The control circuit 123 may further include an error detection/correction circuit (ECC circuit) 126 and the like.

The processor 124 may control the overall operation of the memory controller 120. The processor 124 may perform a logical operation. The processor 124 may communicate with the host HOST through the host interface 121. The processor 124 may communicate with the memory device 110 through the memory interface 122.

The processor 124 may be used to perform operations associated with a flash translation layer (FTL) to effectively manage the memory operations on the memory system 100. The processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, based on the mapping unit. Typical address mapping methods may include a page mapping method, a block mapping method, and a hybrid mapping method.

The processor 124 may be configured to randomize data received from the host to write the randomized data to the memory cell array. For example, the processor 124 may randomize data received from the host by using a randomizing seed. The randomized data is provided to the memory device 110 and written to the memory cell array.

The processor 124 may be configured to derandomize data received from the memory device 110 during a read operation. For example, the processor 124 may derandomize data received from the memory device 110 by using a derandomizing seed. The derandomized data may be output to the host HOST.

The processor 124 may execute firmware (FW) to control the operation of the memory controller 120. The processor 124 may control the overall operation of the memory controller 120 and, in order to perform a logical operation, may execute (drive) firmware loaded into the working memory 125 during booting.

The firmware refers to a program or software stored on a certain nonvolatile memory and is executed inside the memory system 100.

In some implementations, the firmware may include various functional layers. For example, the firmware may include at least one of a flash translation layer (FTL) configured to translate a logical address in the host HOST requests to a physical address of the memory device 110, a host interface layer (HIL) configured to interpret a command that the host HOST issues to a data storage device such as the memory system 100 and to deliver the command to the FTL, and a flash interface layer (FIL) configured to deliver a command issued by the FTL to the memory device 110.

For example, the firmware may be stored in the memory device 110, and then loaded into the working memory 125.

The working memory 125 may store firmware, program codes, commands, or pieces of data necessary to operate the memory controller 120. The working memory 125 may include, for example, at least one among a static RAM (SRAM), a dynamic RAM (DRAM), and a synchronous RAM (SDRAM) as a volatile memory.

The error detection/correction circuit 126 may be configured to detect and correct one or more erroneous bits in the data by using an error detection and correction code. In some implementations, the data that is subject to the error detection and correction may include data stored in the working memory 125, and data retrieved from the memory device 110.

The error detection/correction circuit 126 may be implemented to decode data by using the error correction code. The error detection/correction circuit 126 may be implemented by using various decoding schemes. For example, a decoder that performs nonsystematic code decoding or a decoder that performs systematic code decoding may be used.

In some implementations, the error detection/correction circuit 126 may detect one or more erroneous bits on a sector basis. That is, each piece of read data may include multiple sectors. In the present disclosure, a sector may refer to a data unit that is smaller than the read unit (e.g., page) of a flash memory. Sectors constituting each piece of read data may be mapped based on addresses.

In some implementations, the error detection/correction circuit 126 may calculate a bit error rate (BER) and determine whether the number of erroneous bits in the data is within the error correction capability sector by sector. For example, if the BER is higher than a reference value, the error detection/correction circuit 126 may determine that the erroneous bits in the corresponding sector are uncorrectable and the corresponding sector is marked "fail." If the BER is lower than or equals the reference value, the error detection/correction circuit 126 may determine that the corresponding sector is correctable and the corresponding sector can be marked "pass."

The error detection/correction circuit 126 may perform error detection and correction operations successively on all read data. When a sector included in the read data is correctable, the error detection/correction circuit 126 may move on to the next sector to check whether an error correction operation is needed on the next sector. Upon completion of the error detection and correction operations on all the read data in this manner, the error detection/correction circuit 126 may acquire information as to which sector is deemed uncorrectable in the read data. The error detection/correction circuit 126 may provide such information (e.g., address of uncorrectable bits) to the processor 124.

The memory system 100 may also include a bus 127 to provide a channel between the constituent elements 121, 122, 124, 125, and 126 of the memory controller 120. The bus 127 may include, for example, a control bus for delivering various types of control signals and commands, and a data bus for delivering various types of data.

By way of example, FIG. 1 illustrates the above-mentioned constituent elements 121, 122, 124, 125, and 126 of the memory controller 120. It is noted that some of those illustrated in the drawings may be omitted, or some of the above-mentioned constituent elements 121, 122, 124, 125, and 126 of the memory controller 120 may be integrated into a single element. In addition, in some implementations, one or more other constituent elements may be added to the above-mentioned constituent elements of the memory controller 120.

Figure 2:
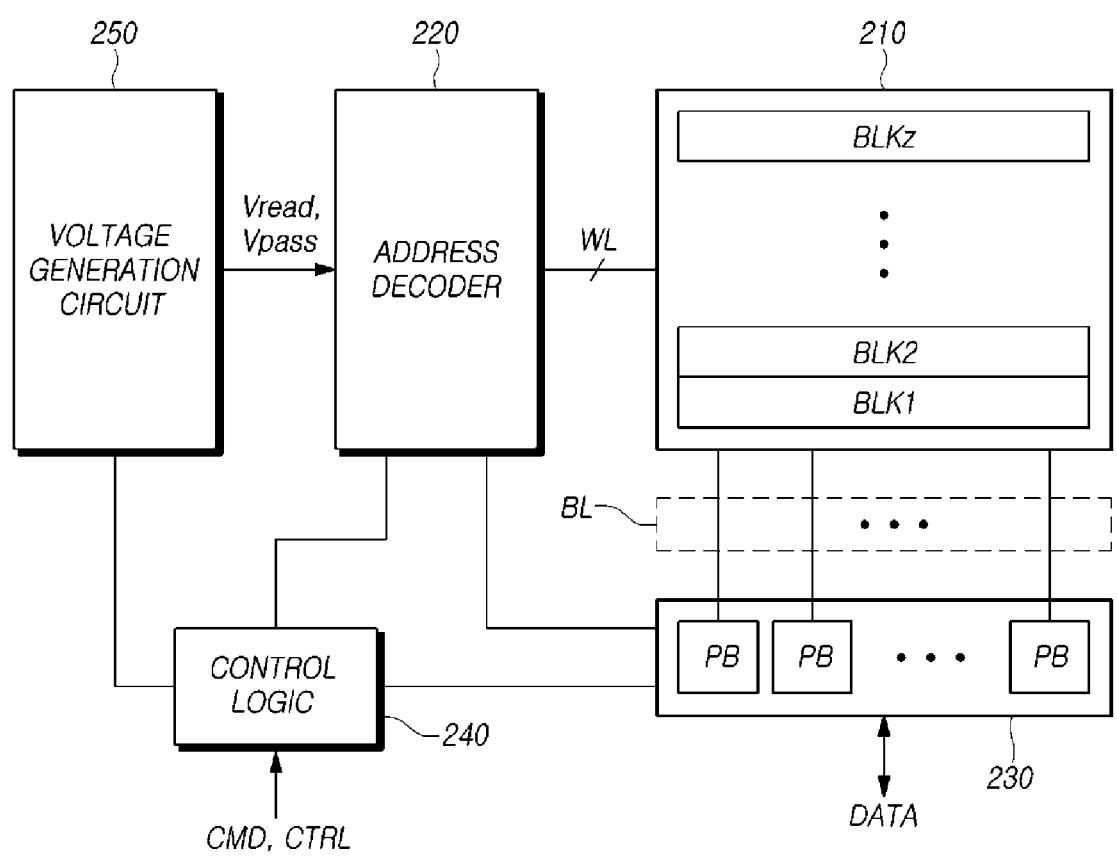
FIG. 2 is a block diagram schematically illustrating a memory device based on an embodiment of the disclosed technology.

FIG. 2 is a block diagram schematically illustrating a memory device 110 based on an embodiment of the disclosed technology.

In some implementations, the memory device 110 based on an embodiment of the disclosed technology may include a memory cell array 210, an address decoder 220, a read/write circuit 230, a control logic 240, and a voltage generation circuit 250.

The memory cell array 210 may include multiple memory blocks BLK1-BLKz, where z is a natural number equal to or greater than 2.

In the multiple memory blocks BLK1-BLKz, multiple word lines WL and multiple bit lines BL may be disposed in rows and columns, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells. In some implementations, such nonvolatile memory cells may be arranged in a vertical channel structure.

The memory cell array 210 may be configured as a memory cell array having a two-dimensional structure. In some implementations, the memory cell array 210 may be arranged in a three-dimensional structure.

Each of the multiple memory cells included in the memory cell array 210 may store at least one bit of data. For example, each of the multiple memory cells included in the memory cell array 210 may be a single-level cell (SLC) configured to store one bit of data. As another example, each of the multiple memory cells included in the memory cell array 210 may be a multi-level cell (MLC) configured to store two bits of data per memory cell. As another example, each of the multiple memory cells included in the memory cell array 210 may be a triple-level cell (TLC) configured to store three bits of data per memory cell. As another example, each of the multiple memory cells included in the memory cell array 210 may be a quad-level cell (QLC) configured to store four bits of data per memory cell. As another example, the memory cell array 210 may include multiple memory cells, each of which may be configured to store at least five bits of data per memory cell.

Referring to FIG. 2, the address decoder 220, the read/write circuit 230, the control logic 240, and the voltage generation circuit 250 may operate as peripheral circuits configured to drive the memory cell array 210.

The address decoder 220 may be connected to the memory cell array 210 through the multiple word lines WL.

The address decoder 220 may be configured to operate in response to command and control signals of the control logic 240.

The address decoder 220 may receive addresses through an input/output buffer inside the memory device 110. The address decoder 220 may be configured to decode a block address among the received addresses. The address decoder 220 may select at least one memory block based on the decoded block address.

The address decoder 220 may receive a read voltage Vread and a pass voltage Vpass from the voltage generation circuit 250.

The address decoder 220 may, during a read operation, apply the read voltage Vread to a selected word line WL inside a selected memory block and apply the pass voltage Vpass to the remaining non-selected word lines WL.

The address decoder 220 may apply a verification voltage generated by the voltage generation circuit 250 to a selected word line WL inside a selected memory block, during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line based on the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that participates in a data processing function and, in some implementations, may further include a cache buffer for data caching.

The multiple page buffers PB may be connected to the memory cell array 210 through the multiple bit lines BL. To detect or sense the threshold voltage Vth of the memory cells during a read operation and a program verification operation, the multiple page buffers PB may continuously supply a sensing current to the bit lines BL connected to the memory cells to detect, at a sensing node, a change proportional to the amount of current that varies depending on the program state of a corresponding memory cell, and may hold or latch the corresponding voltage as sensing data.

The read/write circuit 230 may operate in response to page buffer control signals output from the control logic 240.

During a read operation, the read/write circuit 230 senses a voltage value of a memory cell and the voltage value is read out as data. The read/write circuit 230 temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the voltage level of sensing nodes of multiple page buffers PB to a pre-charge voltage level.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

A memory block BLK included in the memory device 110 may include multiple pages PG. In some implementations, a plurality of memory cells arranged in columns form memory cell strings, and a plurality of memory cells arranged in rows form memory blocks. Each of the multiple pages PG is coupled to one of word lines WL, and each of the memory cell strings STR is coupled to one of bit lines BL.

In the memory block BLK, multiple word lines WL and multiple bit lines BL may be arranged in rows and columns. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

In some implementations, the multiple word lines WL and the multiple bit lines BL may intersect with each other, thereby addressing a single memory cell in the array of multiple memory cells MC. In some implementations, each memory cell MC may include a transistor TR that includes a material layer that can hold an electrical charge.

For example, the transistor TR arranged in each memory cell MC may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some implementations, at least one dummy word line may be additionally arranged between the first outermost word line and the first selection line. In addition, at least one dummy word line may be additionally arranged between the second outermost word line and the second selection line.

A read operation and a program operation (write operation) of the memory block may be performed page by page, and an erasure operation may be performed memory block by memory block.

Figure 3:
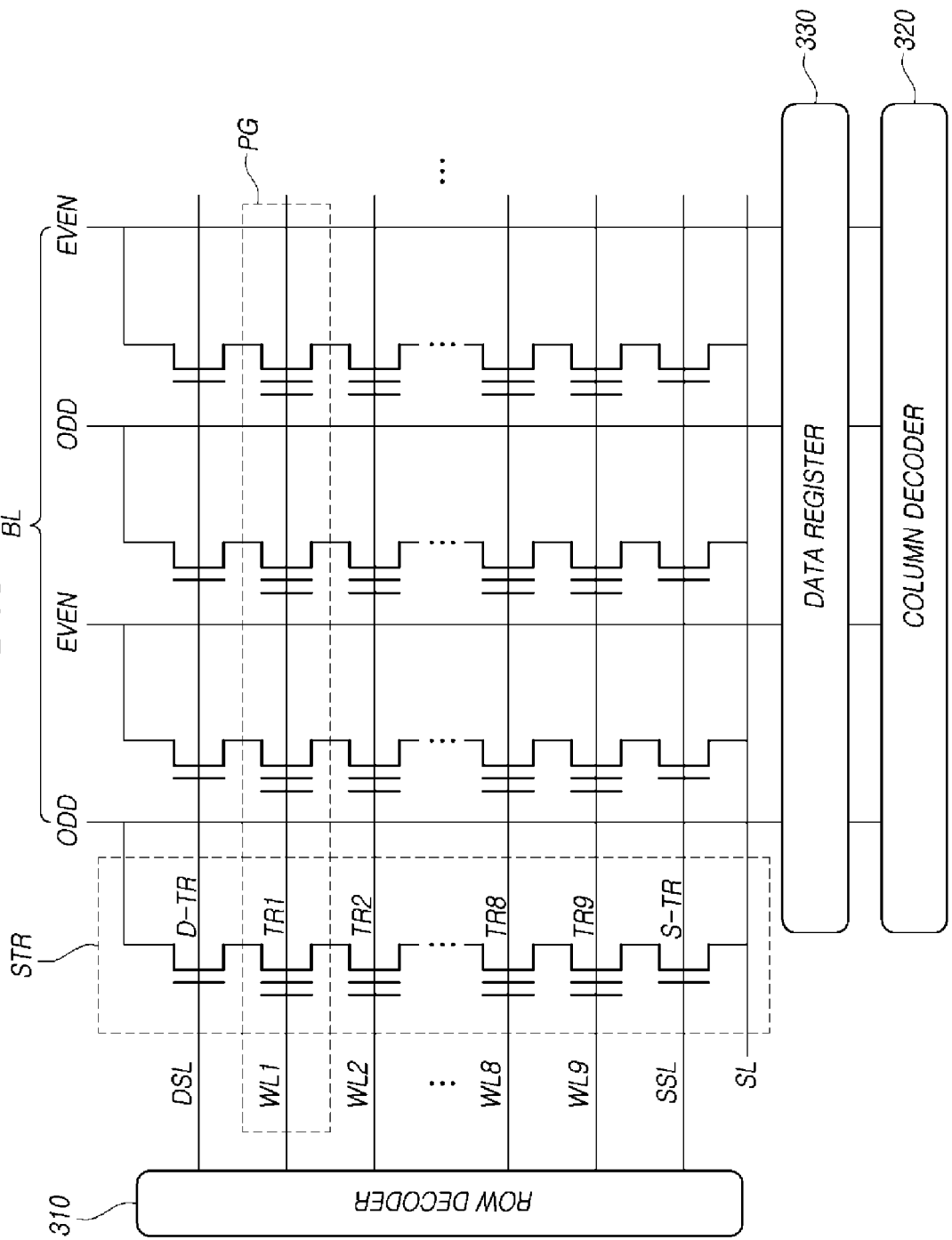
FIG. 3 is a diagram illustrating a structure of word lines and bit lines of a memory device based on an embodiment of the disclosed technology.

FIG. 3 is a diagram illustrating a structure of word lines WL and bit lines BL of a memory device 110 based on an embodiment of the disclosed technology.

Referring to FIG. 3, the memory device 110 has a core area in which memory cells MC are arranged, and an auxiliary area (the remaining area other than the core area) which includes circuitry that is used to perform the operations of the memory cell array 210.

In the core area, a certain number of memory cells arranged in one direction can be called "page" PG, and a certain number of memory cells that are coupled in series can be called "memory cell string" STR.

The word lines WL1-WL9 may be connected to a row decoder 310. The bit lines BL may be connected to a column decoder 320. A data register 330, which corresponds to the read/write circuit 230 of FIG. 2, may exist between the multiple bit lines BL and the column decoder 320.

The multiple word lines WL1-WL9 may correspond to multiple pages PG.

For example, each of the multiple word lines WL1-WL9 may correspond to one page PG as illustrated in FIG. 3. When each of the multiple word lines WL1-WL9 has a large size, each of the multiple word lines WL1-WL9 may correspond to at least two (e.g., two or four) pages PG. Each page PG is the smallest unit in a program operation and a read operation, and all memory cells MC within the same page PG may perform simultaneous operations when conducting a program operation and a read operation.

The multiple bit lines BL may be connected to the column decoder 320. In some implementations, the multiple bit lines BL may be divided into odd-numbered bit lines BL and even-numbered bit lines BL such that a pair of odd-numbered bit line and even-numbered bit line is coupled in common to a column decoder 320.

In accessing a memory cell MC, the row decoder 310 and the column decoder 320 are used to locate a desired memory cell based on the address.

In some implementations, the data register 330 plays an important role because all data processing by the memory device 110, including program and read operations, occurs via the data register 330. If data processing by the data register 330 is delayed, all of the other areas need to wait until the data register 330 finishes the data processing, degrading the overall performance of the memory device 110.

Referring to the example illustrated in FIG. 3, in one memory cell string STR, multiple transistors TR1-TR9 may be connected to multiple word lines WL1-WL9, respectively. In some implementations, the multiple transistors TR1-TR9 correspond to memory cells MC. In this example, the multiple transistors TR1-TR9 include control gates CG and floating gates FG.

The multiple word lines WL1-WL9 include two outermost word lines WL1 and WL9. A first selection line DSL may be additionally arranged outside the first outermost word line WL1, which is closer to the data register 330 and has a shorter signal path compared to the other outermost word line WL9. A second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR is used as a switch circuit that connects the corresponding memory cell string STR to the data register 330. The second selection transistor S-TR is used as a switch that connects the corresponding memory cell string STR to the source line SL. That is, the first selection transistor D-TR and the second selection transistor S-TR can be used to enable or disable the corresponding memory cell string STR.

In some implementations, the memory system 100 applies a predetermined turn-on voltage Vcc to the gate electrode of the first selection transistor D-TR, thereby turning on the first selection transistor D-TR, and applies a predetermined turn-off voltage (e.g., 0V) to the gate electrode of the second selection transistor S-TR, thereby turning off the second selection transistor S-TR.

The memory system 100 turns on both of the first and second selection transistors D-TR and S-TR during a read operation or a verification operation. Accordingly, during a read operation or a verification operation, an electric current may flow through the corresponding memory cell string STR and drain to the source line SL, which corresponds to the ground, such that the voltage level of the bit line BL can be measured. However, during a read operation, there may be a time difference in the on/off timing between the first selection transistor D-TR and the second selection transistor S-TR.

The memory system 100 may apply a predetermined voltage (e.g., +20V) to the substrate through a source line SL during an erasure operation. The memory system 100 applies a certain voltage to allow both the first selection transistor D-TR and the second selection transistor S-TR to float during an erasure operation. As a result, the applied erasure voltage can remove electrical charges from the floating gates FG of the selected memory cells.

Figure 4:
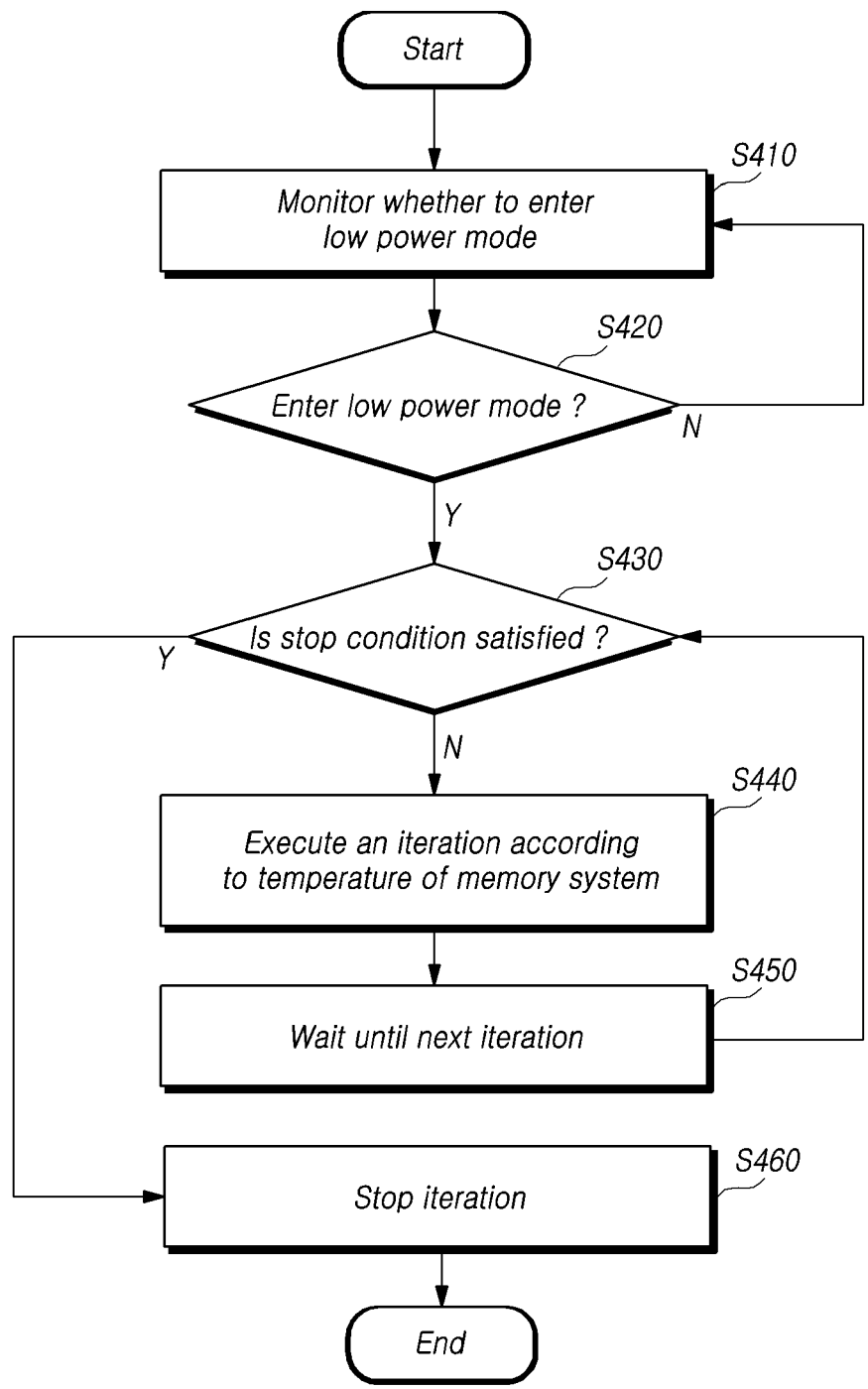
FIG. 4 is a flowchart illustrating a schematic operation of the memory system according to embodiments of the present disclosure.

FIG. 4 is a flowchart illustrating a schematic operation of the memory system 100 according to embodiments of the present disclosure.

Referring to FIG. 4, the memory controller 120 of the memory system 100 may monitor whether to enter the low power mode (S410).

When a specific condition is satisfied, the memory system 100 may enter the low power mode to reduce power consumption. For example, the memory system 100 may enter the idle state after not receiving the data read or write request from the host for a specific period of time or longer, or may enter the low power mode when the supplied power decreases below a specific level.

In this case, when the memory system 100 enters the low power mode, the memory system 100 may (1) prevent the power consumption reduction until a target internal operation is completed, or (2) perform the selective gating for the power domain consuming the power to reduce the power consumption, or (3) proceed the operation without reducing power consumption regardless of the power supplied.

The memory controller 120 may determine whether to enter the low power mode by analyzing the result of step S410 (S420). If the low power mode has not been entered (S420—N), the memory controller 120 may enter step S410 again to monitor whether to enter the low power mode.

When the low power mode has been entered (S420—Y), the memory controller 120 may execute iterations of a target operation according to the temperature of the memory system 100 until the set stop condition is satisfied. Hereinafter, executing the iterations of the target operation may refer to iteratively performing the target operation according to the temperature of the memory system 100. An iteration of an operation of controlling execution of a target operation may be referred to as an iteration.

Specifically, the memory controller 120 may determine whether the stop condition is satisfied (S430).

When the stop condition is not satisfied (S430—N), the memory controller 120 may execute an iteration according to the temperature of the memory system 100 (S440). In addition, the memory controller 120 may wait until the next iteration (S450) and enter step S430 again to determine whether the stop condition is satisfied.

In this case, the memory controller 120 may adjust the speed of executing the iterations by changing the period between the iterations in step S450.

On the other hand, when the stop condition is satisfied (S430—Y), the memory controller 120 may stop the iteration (S460).

In an embodiment, the target operation may be, for example, a garbage collection operation for the plurality of memory blocks included in the memory device 110 or a migration operation of moving data stored in the first area including at least one of the plurality of memory blocks to the second area including at least one of the plurality of memory blocks.

In other embodiments, the target operation may be a background trim operation, a background media scan operation, or a read refresh operation in addition to the above-described garbage collection operation and migration operation.

Hereinafter, the garbage collection operation and migration operation will be described.

FIG. 5 is a diagram illustrating the garbage collection operation as an example of the target operation.

Referring to FIG. 5, each of the plurality of memory blocks BLK included in the memory device 110 may include a plurality of pages. In this case, each page may be a page storing valid data, a page storing invalid data, or an erased page. In this case, data cannot be overwritten on the page storing invalid data, and the corresponding page may be erased first in order to store new data in the page storing invalid data.

The memory controller 120 may collect valid data distributed in the plurality of memory blocks BLK into some of the plurality of memory blocks BLK.

In this case, among the plurality of memory blocks BLK, there may be a memory block in which all of the stored valid data are moved to another memory block. The memory controller 120 may erase such a memory block and change it to a free memory block. Through this, the memory controller 120 may increase the number of free memory blocks among the plurality of memory blocks BLK to secure the free memory block in which new data may be stored thereafter.

Figure 6:
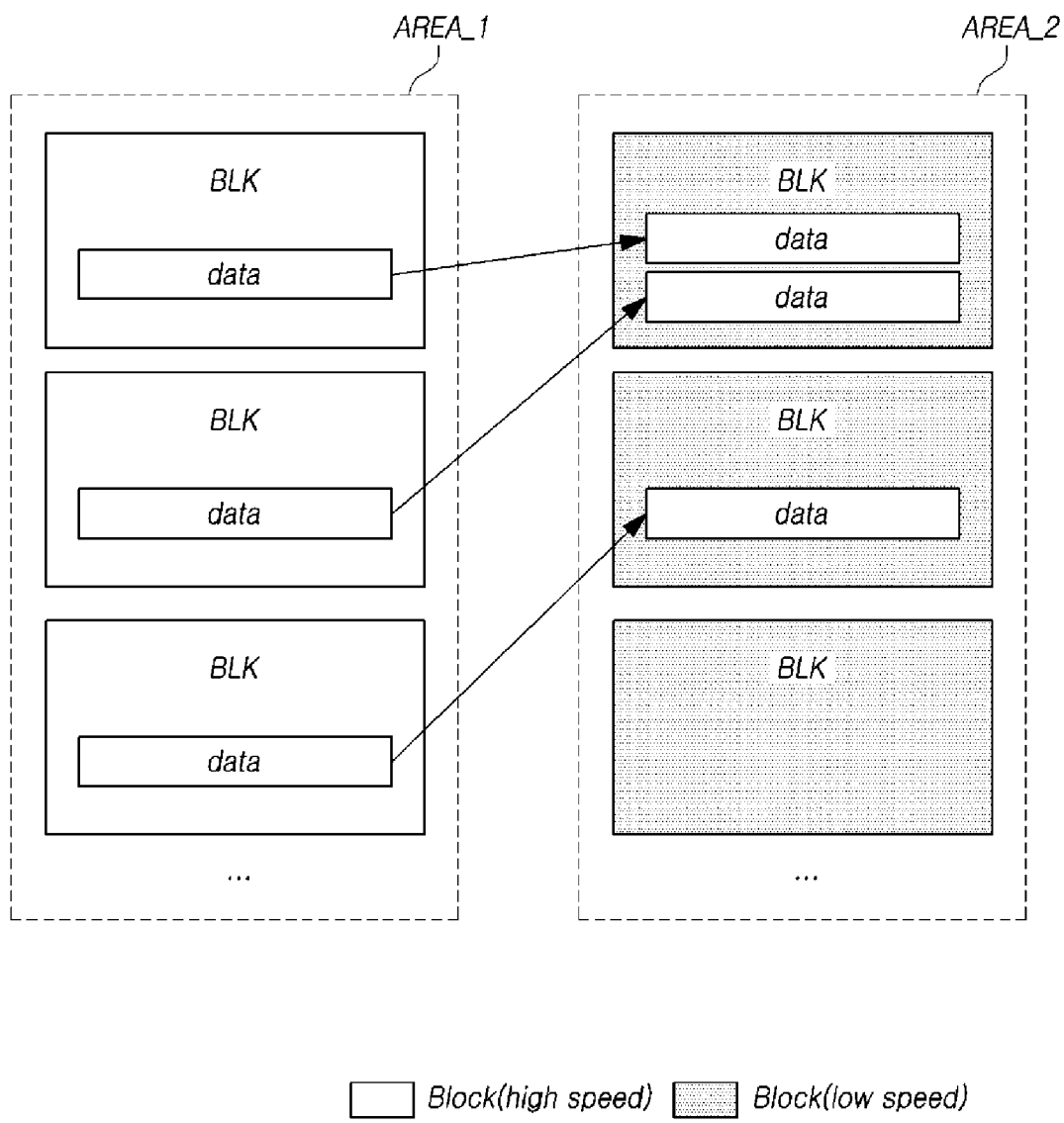
FIG. 6 is a diagram illustrating the migration operation which is an example of a target operation.

FIG. 6 is a diagram illustrating the migration operation as an example of the target operation.

Referring to FIG. 6, the first area AREA_1 may include one or more of the plurality of memory blocks BLK included in the memory device 110. In addition, the second area AREA_2 may include one or more of the plurality of memory blocks BLK included in the memory device 110.

In this case, the memory block included in the first area AREA_1 operates at a higher speed than the memory block included in the second area AREA_2. On the other hand, the memory block included in the second area AREA_2 has a larger storage capacity than the memory block included in the first area AREA_1. Accordingly, the memory controller 120 is advantageous to use the first area AREA_1 to increase the performance of accessing data, while it is advantageous to use the second area AREA_2 to store a large amount of data.

For example, the memory block included in the first area AREA_1 may be a memory block including memory cells (e.g., single level cells) storing 1-bit data. In addition, the memory block included in the second area AREA_2 may be a memory block including memory cells (e.g., multi-level cells, triple-level cells, quad-level cells) storing data of 2 bits or more.

The memory system 100 may improve response performance to the write request from the host by first storing data in the first area AREA_1 capable of high-speed operation. However, since the size of the over-provisioning area is limited, the storage capacity of the first area AREA_1 is limited.

Therefore, the memory controller 120 of the memory system 100 may move the data previously stored in the first area AREA_1 to the second area AREA_2 in order to continuously store the data requested by the host in the first area AREA_1.

The target operation such as the garbage collection operation and the migration operation described above in FIGS. 5 to 6 may satisfy the performance requirements of the memory system 100. In addition, the target operation may be performed in the idle state (i.e., a state in which data input/output for the host is not executed) in order to satisfy the throughput for the host.

However, in the case that the memory system 100 frequently enters the low power mode, since the amount of time that the memory system 100 remains in the idle state decreases, the possibility that the target operation cannot be performed as necessary may be increased. In this case, the memory system 100 may perform the target operation in the process of receiving the request from the host, and the target operation may be limitedly executed to ensure the throughput for the host is at a certain level or more.

Therefore, in embodiments of the present disclosure, the memory system 100 may satisfy the performance requirements of the memory system 100 by iteratively performing the target operation (i.e., by executing the iterations) even when entering the low power mode.

In addition, the memory system 100 may perform the target operation even in a situation in which the low power mode is frequently entered, thereby maintaining the performance consistency regardless of the frequency of entering the low power mode.

Hereinafter, the process in which the memory system 100 performs the target operation within a single iteration (i.e., executes a single iteration) will be described.

Figure 7:
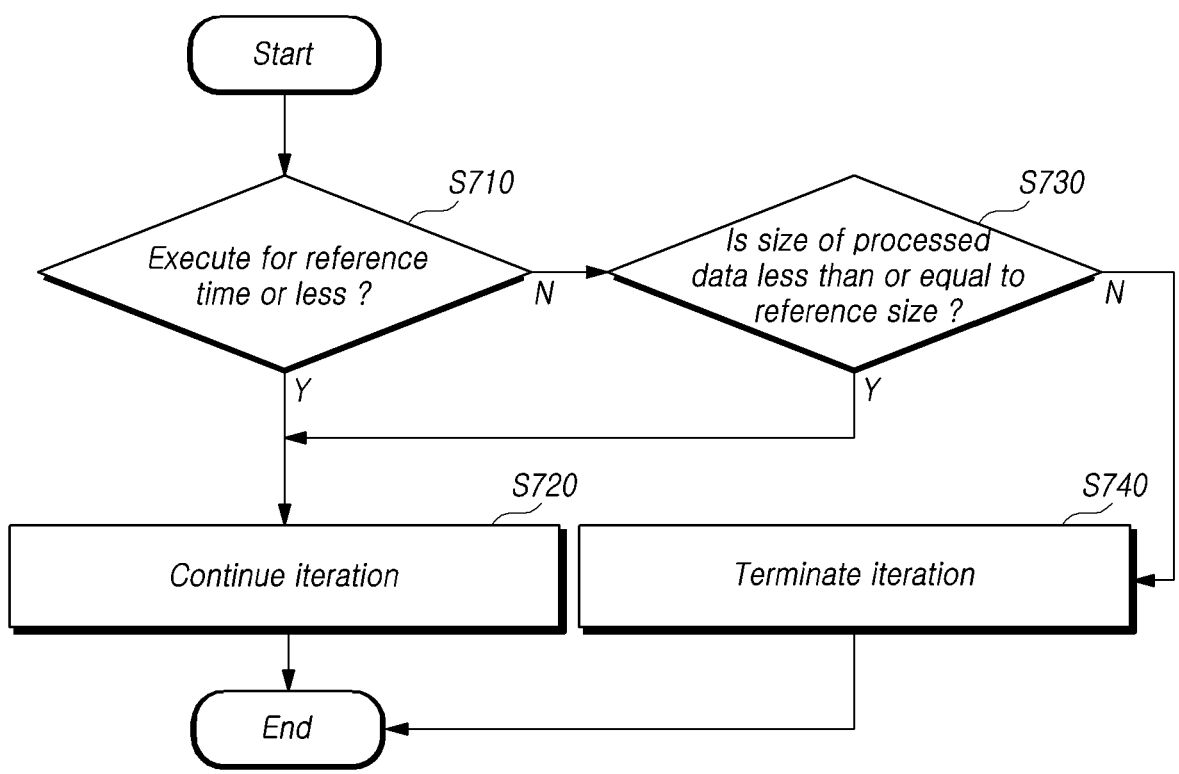
FIG. 7 is a flowchart illustrating an example of a process of executing a single iteration by the memory system according to embodiments of the present disclosure.

FIG. 7 is a flowchart illustrating an example of a process of executing a single iteration by the memory system 100 according to embodiments of the present disclosure.

Referring to FIG. 7, when executing a single iteration, the memory controller 120 of the memory system 100 may determine whether the iteration has been executed within a specific reference time (S710). If the iteration has been executed less than the reference time (S710—Y), the memory controller 120 may continue the iteration (S720).

On the other hand, in the case that the iteration has been executed beyond the reference time (S710—N), the memory controller 120 may determine whether the size of the data processed by the iteration is less than or equal to the specific reference size (S730). If the size of the data processed by the iteration is less than or equal to the reference size (S730—Y), the memory controller 120 may continue the iteration (S720). On the other hand, if the size of data processed by the target operation exceeds the reference size (S730—N), the memory controller 120 may terminate the iteration (S740). In this case, the memory controller 120 may perform the target operation again when the next iteration starts.

That is, the single iteration may be executed for less than the specific reference time or until the size of data processed by the target operation is less than or equal to the reference size. This is to limit the extent to which the single iteration is executed. In the embodiments of the present disclosure, since the iteration is executed after entering the low power mode, when the memory system 100 excessively executes the single iteration, there may be a problem in which the memory system 100 operates abnormally due to the rapid increase in the temperature of the memory system 100.

Figure 8:
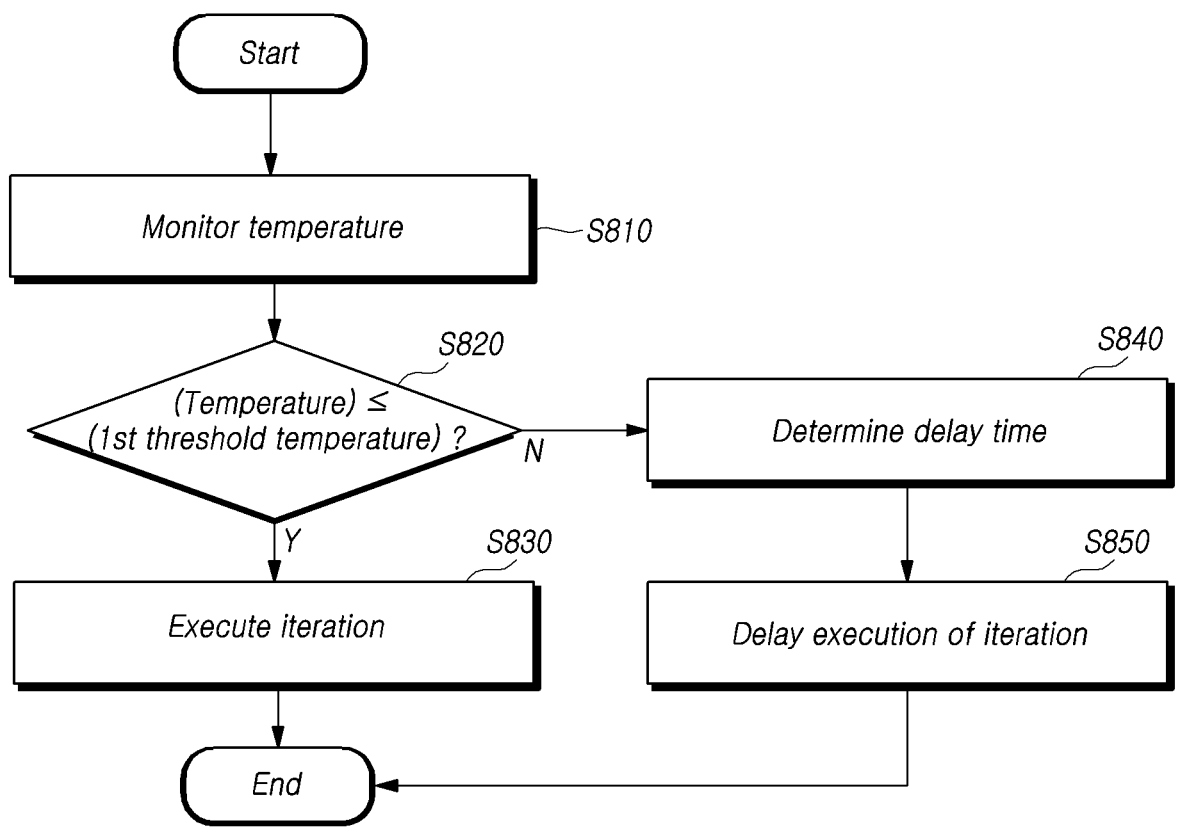
FIG. 8 is a flowchart illustrating a process of executing the single iteration according to the temperature by the memory system according to embodiments of the present disclosure.

FIG. 8 is a flowchart illustrating a process of executing the single iteration according to the temperature by the memory system 100 according to embodiments of the present disclosure.

Referring to FIG. 8, the memory controller 120 of the memory system 100 may monitor the temperature of the memory system 100 when the iteration starts (S810). The temperature of the memory system 100 may be measured, for example, based on an output value of the temperature measurement unit included in the memory system 100.

In the case that the memory controller 120 includes a plurality of cores, a core performing the operation of monitoring the temperature of the memory system 100 and a core performing the target operation may be different from each other. In this case, the two cores may exchange information through communication between the cores.

The memory controller 120 may determine whether the temperature of the memory system 100 is less than or equal to a specific first threshold temperature based on the result of monitoring (S820).

If the temperature of the memory system 100 is less than or equal to the first threshold temperature (S820—Y), the memory controller 120 may execute the iteration (S830). This is because even if the memory controller 120 executes the iteration, the temperature of the memory system 100 may be maintained below a certain level, thereby preventing a problem in which the memory system 100 operates abnormally.

On the other hand, when the temperature of the memory system 100 exceeds the first threshold temperature, the memory controller 120 may determine delay time (S840) and delay execution of the iterations during the delay time (S850). Accordingly, when the temperature of the memory system 100 exceeds the first threshold temperature, the memory controller 120 may start the iterations again after the delay time.

This is to prevent a problem in which a memory system operates abnormally because the temperature of the memory system exceeds a certain level when the target operation is immediately executed.

In this case, the delay time may be determined according to the temperature of the memory system. Hereinafter, this will be described in detail in FIG. 9.

FIG. 9 is a diagram illustrating an example of determining the delay time according to temperature.

Referring to FIG. 9, the memory controller 120 may set a plurality of levels determined according to temperature, and may determine the delay time differently depending on which level the temperature of the memory system 100 belongs to.

For example, the memory controller 120 may set five levels L1, L2, L3, L4, and L5. If the temperature of the memory system 100 is less than or equal to the first temperature T1, the temperature of the memory system 100 belongs to the level L1. If the temperature of the memory system 100 exceeds the first temperature T1 and is less than or equal to the second temperature T2, the temperature of the memory system 100 belongs to the level L2. If the temperature of the memory system 100 exceeds the second temperature T2 and is less than or equal to the third temperature T3, the temperature of the memory system 100 belongs to the level L3. If the temperature of the memory system 100 exceeds the third temperature T3 and is less than or equal to the fourth temperature T4, the temperature of the memory system 100 belongs to the level L4. If the temperature of the memory system 100 exceeds the fourth temperature T4, the temperature of the memory system 100 belongs to the level L5. In this case, the relationship of the magnitude of the temperatures may be the first temperature T1<the second temperature T2<the third temperature T3<the fourth temperature T4.

When the temperature of the memory system 100 belongs to the level L1, the memory controller 120 may determine the delay time as the first delay time DELAY_1. When the temperature of the memory system 100 belongs to the level L2, the memory controller 120 may determine the delay time as the second delay time DELAY_2. When the temperature of the memory system 100 belongs to the level L3, the memory controller 120 may determine the delay time as the third delay time DELAY_3. When the temperature of the memory system 100 belongs to the level L4, the memory controller 120 may determine the delay time as the fourth delay time DELAY_4. When the temperature of the memory system 100 belongs to the level L5, the memory controller 120 may determine the delay time as the fifth delay time DELAY_5. In this case, the relationship between the magnitude of the delay time may be the first delay time DELAY_1<the second delay time DELAY_2<the third delay time DELAY_3<the fourth delay time DELAY_4<the fifth delay time DELAY_5.

As described above, the memory controller 120 may lower the temperature of the memory system 100 by delaying the iterations longer as the temperature of the memory system 100 increases, thereby managing the temperature of the memory system 100 to be below a certain level.

Furthermore, the period between the iterations described above may also be determined according to the temperature of the memory system 100.

FIG. 10 is a diagram illustrating an example of determining the period between the iterations according to temperature.

Referring to FIG. 10, the memory controller 120 may set the plurality of levels determined according to the temperature and may differently determine the period between the iterations according to which level the temperature of the memory system 100 belongs.

For example, the memory controller 120 may set five levels L1', L2', L3', L4', and L5' as in FIG. 9. If the temperature of the memory system 100 is less than or equal to the first' temperature T1', the temperature of the memory system 100 belongs to the level L1'. If the temperature of the memory system 100 exceeds the first' temperature T1' and is less than or equal to the second' temperature T2', the temperature of the memory system 100 belongs to the level L2'. If the temperature of the memory system 100 exceeds the second' temperature T2' and is less than or equal to the third' temperature T3', the temperature of the memory system 100 belongs to the level L3'. If the temperature of the memory system 100 exceeds the third' temperature T3' and is less than or equal to the fourth' temperature T4', the temperature of the memory system 100 belongs to the level L4'. If the temperature of the memory system 100 exceeds the fourth' temperature T4', the temperature of the memory system 100 belongs to the level L5'. In this case, the relationship of the magnitude of the temperature may be the first' temperature T1'<the second' temperature T2'<the third' temperature T3'<the fourth' temperature T4'.

When the temperature of the memory system 100 belongs to the level L1', the memory controller 120 may determine the period between the iterations as 1 second. When the temperature of the memory system 100 belongs to the level L2', the memory controller 120 may determine the period between the iterations as 2 seconds. When the temperature of the memory system 100 belongs to the level L3', the memory controller 120 may determine the period between the iterations as 3 seconds. When the temperature of the memory system 100 belongs to the level L4', the memory controller 120 may determine the period between the iterations as 4 seconds. When the temperature of the memory system 100 belongs to the level L5', the memory controller 120 may determine the period between the iterations as 5 seconds.

In the above, it has been described the manner in which the memory system 100 performs the target operation within a single iteration.

Hereinafter, the operation in which the memory system 100 determines whether the specific stop condition is satisfied and determines whether to continue the iterations will be described with reference to the flowchart.

Figure 11:
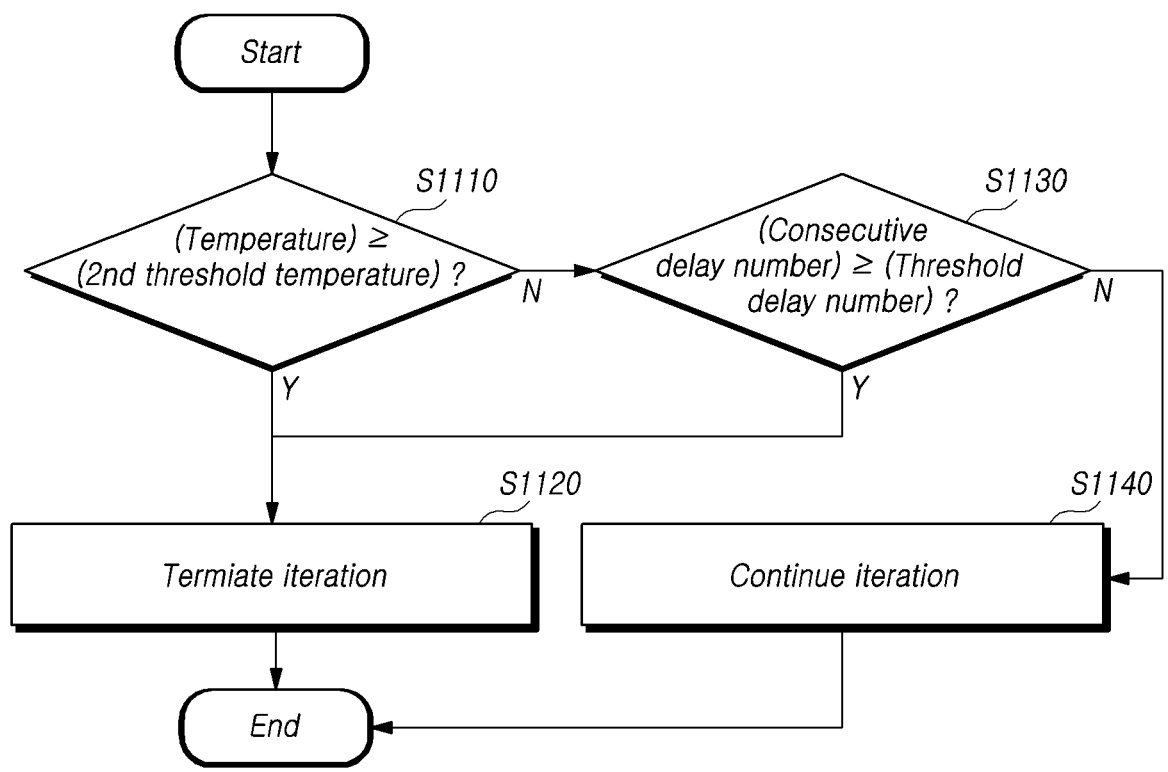
FIG. 11 is a flowchart illustrating an example of a process of determining whether to continue iterations by the memory system according to embodiments of the present disclosure.

FIG. 11 is a flowchart illustrating an example of a process of determining whether to continue the iterations by the memory system 100 according to embodiments of the present disclosure.

Referring to FIG. 11, the memory controller 120 of the memory system 100 may determine whether the temperature of the memory system 100 is higher than or equal to the specific second threshold temperature (S1110).

In the case that the temperature of the memory system 100 is higher than or equal to the second threshold temperature (S1110—Y), the memory controller 120 may terminate the iterations (S1120). This is because the temperature of a memory system increases, thereby there may increase the possibility of abnormal operation of the memory system when executing the target operation.

On the other hand, in the case that the temperature of the memory system 100 is less than the second threshold temperature (S1110—N), the memory controller 120 may determine whether a consecutive number of times that the iterations are delayed is equal to or greater than the specific threshold delay number (S1130).

If the consecutive number is greater than or equal to the threshold delay number (S1130—Y), the memory controller 120 may stop the iterations (S1120). This is because the memory system 100 continuously delaying the execution of the iterations means that the memory system 100 is in a state in which the memory system 100 cannot normally execute the target operation.

On the other hand, in the case that the consecutive number is less than the threshold delay number (S1130—N), the memory controller 120 may continue the iterations (S1140).

In the above, the situation in which the memory system 100 can execute the iteration has been described.

Hereinafter, it will be described an example of determining one of the garbage collection operation or migration operation as the target operation, when the memory system 100 is capable of executing the iteration.

Figure 12:
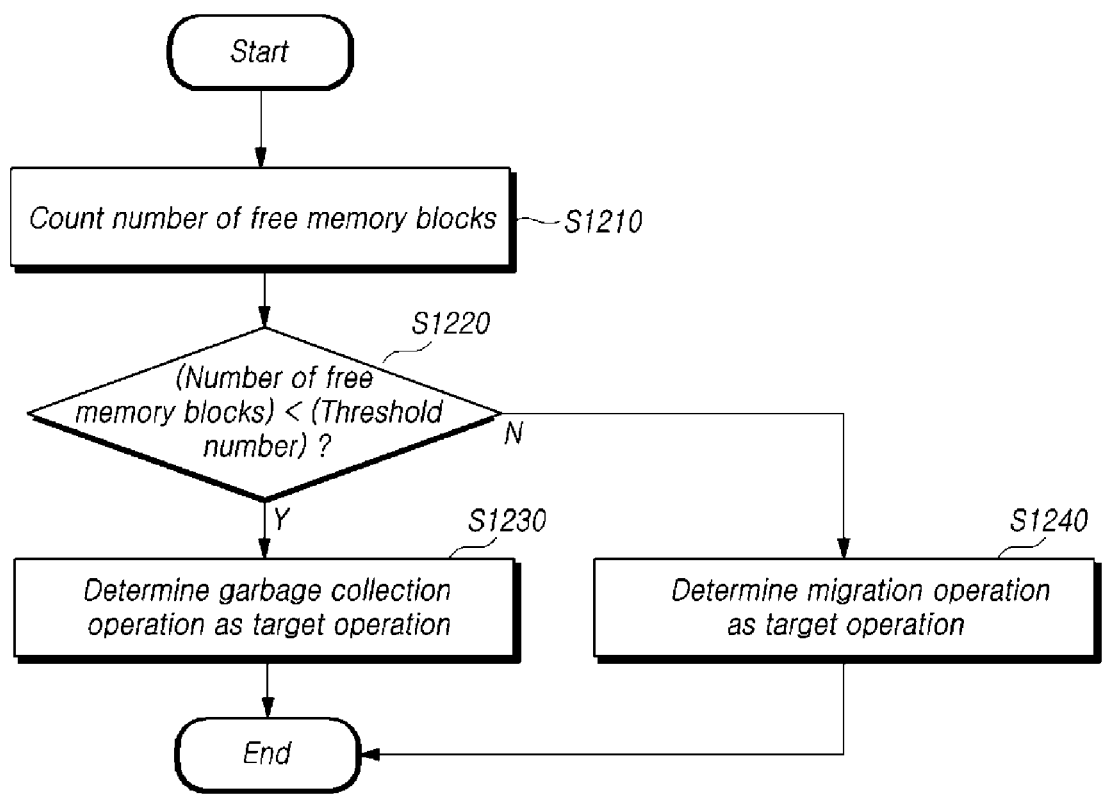
FIG. 12 is a flowchart illustrating a process of determining the target operation by the memory system according to embodiments of the present disclosure.

FIG. 12 is a flowchart illustrating a process of determining the target operation by the memory system 100 according to embodiments of the present disclosure.

Referring to FIG. 12, the memory controller 120 of the memory system 100 may count the number of free memory blocks among the plurality of memory blocks included in the memory device 110 (S1210).

The memory controller 120 may determine whether the number of free memory blocks is less than the threshold number (S1220).

If the number of free memory blocks is less than the threshold number (S1220—Y), the memory controller 120 may determine the garbage collection operation as the target operation in order to secure the free memory blocks (S1230).

On the other hand, if the number of free memory blocks is greater than or equal to the threshold number (S1220—N), the memory controller 120 may determine the migration operation as the target operation (S1240). Since there is no need to immediately secure the free memory block through the garbage collection, the data stored in the first area AREA_1 may be moved to the second area AREA_2 to secure a space to store new data in the first area AREA_1.

Figure 13:
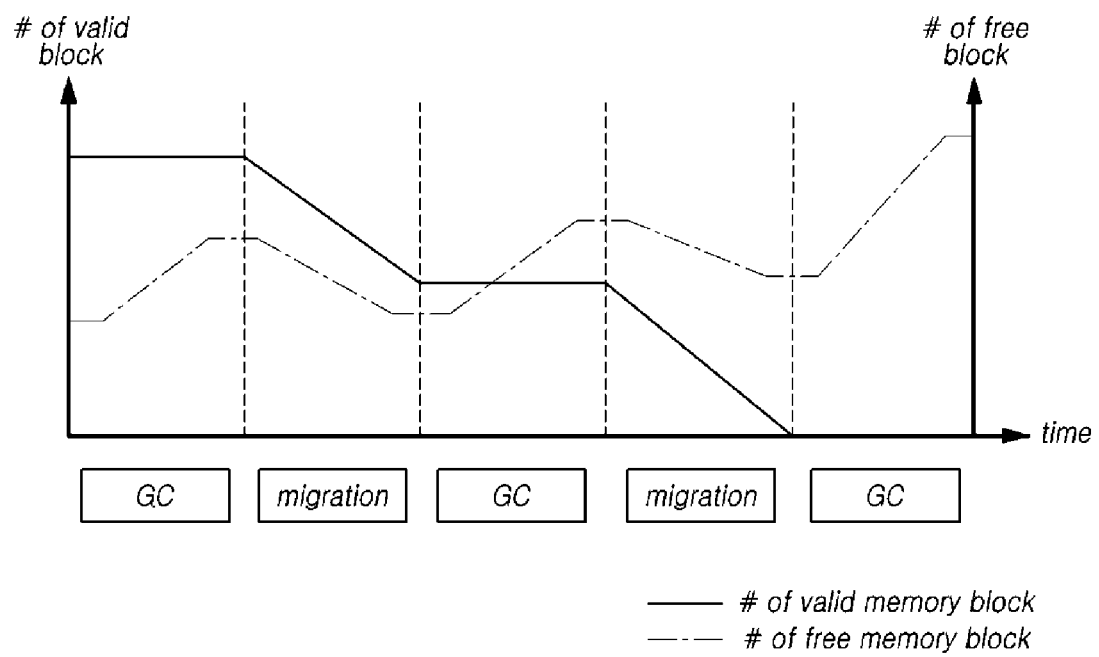
FIG. 13 is a diagram illustrating the state change of the memory system according to execution of the iterations.

FIG. 13 is a diagram illustrating the state change of the memory system 100 according to execution of the iterations.

Referring to FIG. 13, in the case that the target operation is the garbage collection operation, the number of free memory blocks among the plurality of memory blocks included in the memory device 110 may increase as the iteration is executed. In this case, since the migration operation is not executed, the number of valid memory blocks storing valid data among the memory blocks included in the first area AREA_1 may be maintained unchanged.

When the target operation is later changed to the migration operation, the effective data stored in the first area AREA_1 is moved to the second area AREA_2 while the iteration is executed, so the number of effective memory blocks among the memory blocks included in the first area AREA_1 decreases. In this case, since data is stored in the free memory block included in the second area AREA_2, the total number of free memory blocks decreases.

As these iterations are executed, the number of effective memory blocks among the memory blocks included in the first area AREA_1 may gradually decrease as the migration operation is performed. In addition, the total number of free memory blocks may increase when the garbage collection operation is performed and may decrease when the migration operation is performed. Therefore, the memory system 100 may complete the iterations while maintaining the number of free memory blocks at a predetermined level or more.

Figure 14:
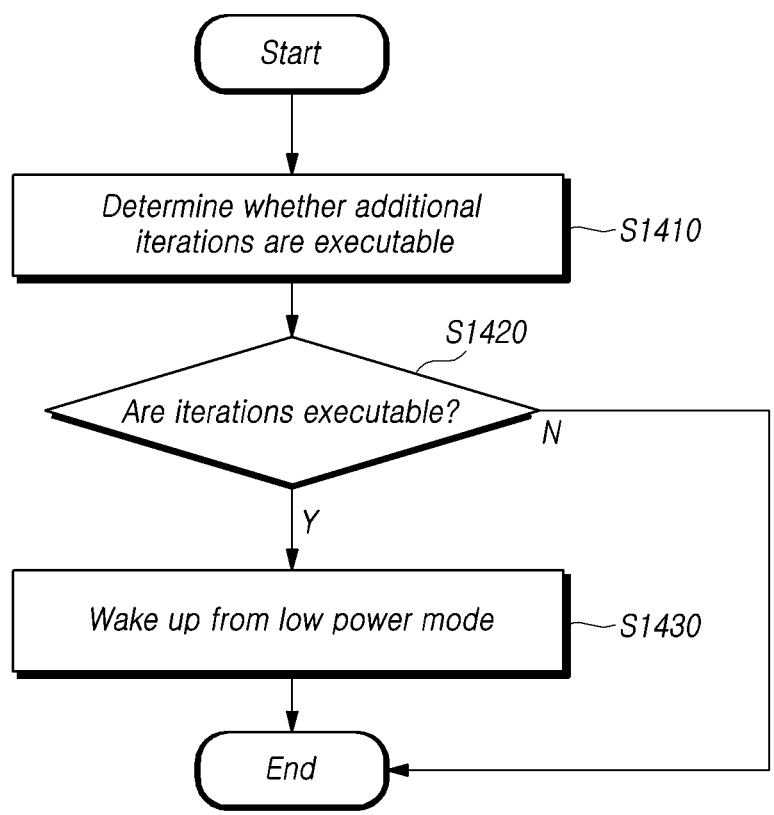
FIG. 14 is a flowchart illustrating an operation after the memory system stops the iterations according to embodiments of the present disclosure.

FIG. 14 is a flowchart illustrating an operation after the memory system 100 stops the iterations according to embodiments of the present disclosure.

Referring to FIG. 14, the memory controller 120 of the memory system 100 may determine whether the additional iterations can be executed after stopping the iterations (S1410).

For example, in the case that there is no valid data stored in the first area AREA_1 and the number of free memory blocks is greater than or equal to a predetermined value, the memory controller 120 may determine that the iteration is no longer executable. On the other hand, the memory controller 120 may determine that the iterations are executable when valid data is stored in the first area AREA_1 or when the number of free memory blocks is less than a predetermined value.

When the iterations are executable (S1420—Y), the memory controller 120 may wake up from the low power mode (S1430).

In this case, the memory controller 120 may generate a message requesting execution of the additional iterations to wake up from the low power mode. In the case that the memory controller 120 includes the plurality of cores, the core generating the message requesting execution of the additional target operation may be different from the core processing the wake-up operation from the low power mode.

When the memory controller 120 wakes up from the low power mode by the message requesting execution of the additional iterations, the memory controller 120 may determine whether the additional iterations can be executed. To this end, the memory controller 120 may check the temperature of the memory system 100.

If the additional iterations are executable, the memory controller 120 may execute the additional iterations. On the other hand, when the additional iteration is not executable, the memory controller 120 may enter the low power mode again.

Figure 15:
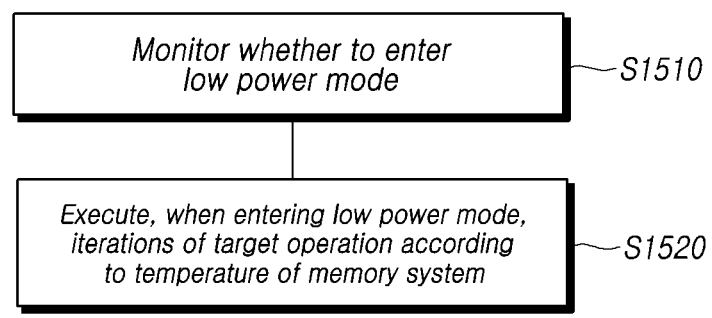
FIG. 15 is a diagram illustrating the operating method of the memory system according to embodiments of the present disclosure.

FIG. 15 is a diagram illustrating the operating method of the memory system 100 according to embodiments of the present disclosure.

Referring to FIG. 15, the operating method of the memory system 100 may include monitoring whether to enter the low power mode (S1510).

Furthermore, the operating method of the memory system 100 may include executing, when entering the low power mode, the iterations of the target operation according to a temperature of the memory system 100 until a stop condition is satisfied (S1520).

The target operation may be the garbage collection operation for the plurality of memory blocks or the migration operation for moving data stored in the first area AREA_1 including at least one of the plurality of memory blocks to the second area AREA_2 including at least one of the plurality of memory blocks. In this case, the operation speed of the memory block included in the first area AREA_1 may be higher than the operation speed of the memory block included in the second area AREA_2.

Each iteration may be executed, for example, for a predetermined reference time or less, or may be executed until the size of data processed by the iteration is less than or equal to the reference size.

The memory block included in the first area AREA_1 may be a memory block including single level cells, and the memory block included in the second area AREA_2 may be a memory block including multi-level cells.

Operation S1520 may include monitoring the temperature of the memory system when each iteration starts.

In addition, the operation S1520 may include executing the iteration when the temperature of the memory system 100 is less than or equal to the first threshold temperature, and delaying the iterations, when the temperature of the memory system exceeds the first threshold temperature, by the delay time determined according to the temperature of the memory system. In this case, the period between the iterations may be determined based on the temperature of the memory system 100.

The iterations may be stopped when, for example, the temperature of the memory system 100 is equal to or higher than the second threshold temperature or the consecutive number of times that the iterations are delayed is equal to or greater than the threshold delay number.

In each of the iterations, the garbage collection operation may be determined as the target operation when the number of free memory blocks among the plurality of memory blocks is less than the specific threshold number and the migration operation may be determined as the target operation when the number of free memory blocks among the plurality of memory blocks is greater than or equal to the specific threshold number.

The operating method of the memory system 100 may further include a step of waking up from the low power mode when the iterations are additionally executable after the iterations are stopped as the stop condition is satisfied.

In some implementations, the operation of the memory controller 120 described above may be controlled by the control circuit 123, and may be performed in such a manner that the processor 124 executes (drives) firmware in which the overall operation of the memory controller 120 is programmed.

Figure 16:
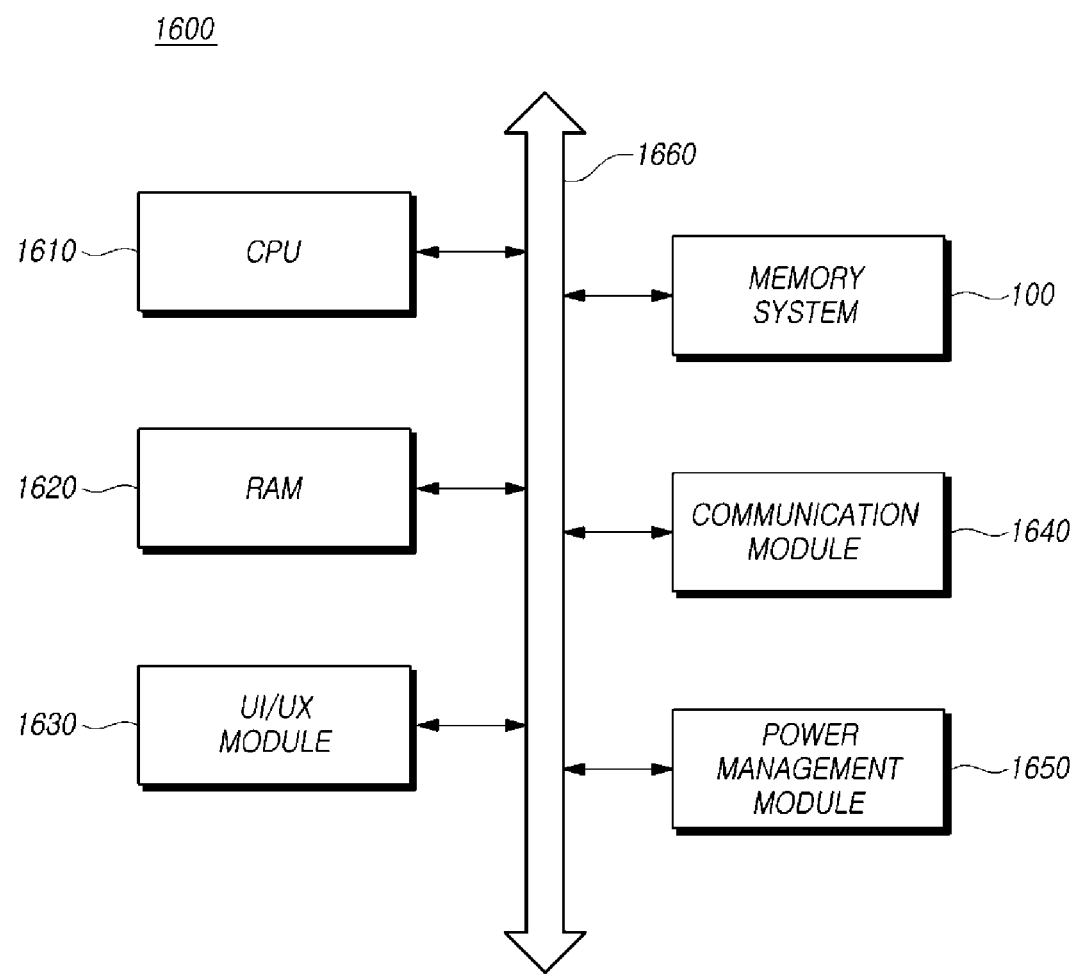
FIG. 16 is a diagram illustrating the configuration of a computing system based on some embodiments of the disclosed technology.

FIG. 16 is a diagram illustrating the configuration of a computing system 1600 based on an embodiment of the disclosed technology.

Referring to FIG. 16, the computing system 1600 based on an embodiment of the disclosed technology may include: a memory system 100 electrically connected to a system bus 1660; a CPU 1610 configured to control the overall operation of the computing system 1600; a RAM 1620 configured to store data and information related to operations of the computing system 1600; a user interface/user experience (UI/UX) module 1630 configured to provide the user with a user environment; a communication module 1640 configured to communicate with an external device as a wired and/or wireless type; and a power management module 1650 configured to manage power used by the computing system 1600.

The computing system 1600 may be a personal computer (PC) or may include a mobile terminal such as a smartphone, a tablet or various electronic devices.

The computing system 1600 may further include a battery for supplying an operating voltage, and may further include an application chipset, a graphic-related module, a camera image processor, and a DRAM. Other elements would be apparent to a person skilled in the art.

The memory system 100 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as storage devices of various types and mounted inside various electronic devices.

Based on embodiments of the disclosed technology described above, the operation delay time of the memory system may be advantageously reduced or minimized. In addition, based on an embodiment of the disclosed technology, an overhead occurring in the process of calling a specific function may be advantageously reduced or minimized. Although various embodiments of the disclosed technology have been described with particular specifics and varying details for illustrative purposes, those skilled in the art will appreciate that various modifications, additions and substitutions may be made based on what is disclosed or illustrated in the present disclosure.

The above-described embodiments of the present invention are intended to illustrate and not to limit the present invention. Various alternatives and equivalents are possible. The invention is not limited by the embodiments described herein. Nor is the invention limited to any specific type of memory system. Additions, subtractions, or modifications which are apparent in view of the present disclosure are intended to fall within the scope of the appended claims.

What is claimed is:

1. A memory system comprising:
a memory device including a plurality of memory blocks; and
a memory controller for communicating with the memory device and controlling the memory device;
wherein the memory controller executes, when entering a low power mode, iterations of a target operation according to a temperature of the memory system until a stop condition is satisfied,
wherein the target operation is a garbage collection operation for the plurality of memory blocks or a migration operation of moving data stored in a first area including at least one of the plurality of memory blocks to a second area including at least one of the plurality of memory blocks, and
wherein the memory controller determines, in each of the iterations, the garbage collection operation as the target operation when a number of free memory blocks among the plurality of memory blocks is less than a threshold number and determines the migration operation as the target operation when the number of free memory blocks among the plurality of memory blocks is greater than or equal to the threshold number.

2. The memory system of claim 1, wherein an operation speed of the memory block included in the first area is higher than the operation speed of the memory block included in the second area.

3. The memory system of claim 1, wherein the memory controller executes each of the iterations for a predetermined reference time or less or until a size of data processed by each iteration is less than or equal to a reference size.

4. The memory system of claim 1, wherein the memory block included in the first area is a memory block including memory cells each storing 1-bit data, and the memory block included in the second area is a memory block including memory cells each storing 2 bits or more of data.

5. The memory system of claim 1, wherein the memory controller:
monitors the temperature of the memory system at a start of each of the iterations,
executes each iteration when the temperature of the memory system is less than or equal to a first threshold temperature, and
delays, when the temperature of the memory system exceeds the first threshold temperature, the iterations by a delay time determined according to the temperature of the memory system.

6. The memory system of claim 5, wherein the memory controller determines a period between the iterations based on the temperature of the memory system.

7. The memory system of claim 5, wherein the memory controller stops the iterations when the temperature of the memory system is equal to or greater than a second threshold temperature or when a consecutive number of times that the iterations are delayed is equal to or greater than a threshold delay number.

8. The memory system of claim 1, wherein the memory controller wakes up from the low power mode when the iterations are additionally executable after the iterations are stopped when the stop condition is satisfied.

9. An operating method of the memory system including a memory device with a plurality of memory blocks comprising:
monitoring whether the memory system enters a low power mode; and
executing, when entering the low power mode, iterations of a target operation according to a temperature of the memory system until a stop condition is satisfied,
wherein the target operation is a garbage collection operation for the plurality of memory blocks or a migration operation of moving data stored in a first area including at least one of the plurality of memory blocks to a second area including at least one of the plurality of memory blocks, and
wherein the executing of the iterations includes determining, in each of the iterations, the garbage collection operation as the target operation when a number of free memory blocks among the plurality of memory blocks is less than a threshold number and determining the migration operation as the target operation when the number of free memory blocks among the plurality of memory blocks is greater than or equal to the threshold number.

10. The operating method of claim 9, wherein an operation speed of the memory block included in the first area is higher than the operation speed of the memory block included in the second area.

11. The operating method of claim 9, wherein each of the iterations is executed for a predetermined reference time or less or until a size of data processed by each iteration is less than or equal to a reference size.

12. The operating method of claim 9, wherein the memory block included in the first area is a memory block including a single level cell, and the memory block included in the second area is a memory block including multiple level cells.

13. The operating method of claim 9, wherein the executing of the iterations of the target operation according to the temperature of the memory system comprises,
monitoring the temperature of the memory system at a start of each of the iterations,
executing each iteration when the temperature of the memory system is less than or equal to a first threshold temperature, and
delaying, when the temperature of the memory system exceeds the first threshold temperature, the iterations by a delay time determined according to the temperature of the memory system.

14. The operating method of claim 13, further comprising determining a period between the iterations based on the temperature of the memory system.

15. The operating method of claim 13, wherein the executing of the iterations includes stopping the iterations when the temperature of the memory system is equal to or greater than a second threshold temperature or when a consecutive number of times that the iterations are delayed is equal to or greater than a threshold delay number.

16. The operating method of claim 9, further comprising waking up from the low power mode when the iterations are additionally executable after the iterations are stopped when the stop condition is satisfied.

17. A memory system comprising:
a memory device including plural memory blocks; and
a controller configured to:
select one of a garbage collection operation and a data migration operation according to a number of free blocks among the memory blocks, and
control the device to perform the selected operation,
wherein the controller is further configured to perform, in a low power mode of the system, a set of the selecting and the controlling according to a temperature of the system
wherein the controller is configured to perform the set within an interval iteratively, and
wherein the controller determines, in each of the interval iterations, the garbage collection operation as a target operation when a number of free memory blocks among the plurality of memory blocks is less than a threshold number and determines the migration operation as the target operation when the number of free memory blocks among the plurality of memory blocks is greater than or equal to the threshold number.

* * * * *